(12) United States Patent
Stockett et al.

(10) Patent No.: US 11,135,769 B2
(45) Date of Patent: Oct. 5, 2021

(54) IN-SITU CURING OVEN FOR ADDITIVE MANUFACTURING SYSTEM

(71) Applicant: CC3D LLC, Coeur d'Alene, ID (US)

(72) Inventors: Ryan C. Stockett, Lebanon, NH (US); Kenneth Lyle Tyler, Coeur d'Alene, ID (US)

(73) Assignee: Continuous Composites inc., Coeur d'Alene, ID (US)

( * ) Notice: Subject to any disclaimer, the term of this patent is extended or adjusted under 35 U.S.C. 154(b) by 583 days.

(21) Appl. No.: 15/995,022

(22) Filed: May 31, 2018

(65) Prior Publication Data

US 2019/0001571 A1 Jan. 3, 2019

Related U.S. Application Data

(60) Provisional application No. 62/526,448, filed on Jun. 29, 2017.

(51) Int. Cl.
*B29C 64/209* (2017.01)
*B29C 64/165* (2017.01)
(Continued)

(52) U.S. Cl.
CPC .......... *B29C 64/209* (2017.08); *B29C 64/124* (2017.08); *B29C 64/165* (2017.08); *B29C 64/218* (2017.08); *B29C 64/255* (2017.08); *B29C 64/291* (2017.08); *B29C 64/295* (2017.08); *B29C 64/336* (2017.08); *B29C 64/393* (2017.08); *B29C 64/40* (2017.08); *B29C 70/06* (2013.01); *B29C 70/16* (2013.01); *B29C 70/24* (2013.01); *B29C 70/384* (2013.01); *B29C 70/50* (2013.01); *B29C 70/523* (2013.01); *B33Y 10/00* (2014.12); *B33Y 30/00* (2014.12);
(Continued)

(58) Field of Classification Search
CPC ..................................................... B29C 64/209
See application file for complete search history.

(56) References Cited

U.S. PATENT DOCUMENTS

| 2,820,131 A | 1/1958 | Kodama |
| 3,286,305 A | 11/1966 | Seckel |

(Continued)

FOREIGN PATENT DOCUMENTS

| DE | 4102257 A1 | 7/1992 |
| EP | 2589481 B1 | 1/2016 |

(Continued)

OTHER PUBLICATIONS

International Search Report dated Sep. 10, 2018 for PCT/US18/35773 to CC3D LLC Filed Jun. 4, 2018.

(Continued)

*Primary Examiner* — Larry W Thrower
(74) *Attorney, Agent, or Firm* — Ryan C. Stockett

(57) ABSTRACT

A system is disclosed for additively manufacturing a composite structure. The system may include a head configured to discharge a continuous reinforcement that is at least partially coated with a matrix, and a housing trailing from the head and configured to at least partially enclose the continuous reinforcement after discharge. The system may also include a heat source disposed at least partially inside the oven, and a support configured to move the head during discharging.

19 Claims, 2 Drawing Sheets

(51) Int. Cl.
| | | |
|---|---|---|
| *B29C 70/38* | (2006.01) | |
| *B29C 70/06* | (2006.01) | |
| *B29C 70/52* | (2006.01) | |
| *B33Y 30/00* | (2015.01) | |
| *B33Y 10/00* | (2015.01) | |
| *B29C 70/50* | (2006.01) | |
| *B29C 70/24* | (2006.01) | |
| *B29C 64/218* | (2017.01) | |
| *B29C 64/336* | (2017.01) | |
| *B29C 70/16* | (2006.01) | |
| *B33Y 70/00* | (2020.01) | |
| *B29C 64/295* | (2017.01) | |
| *B29C 64/291* | (2017.01) | |
| *B33Y 50/02* | (2015.01) | |
| *B29C 64/393* | (2017.01) | |
| *B29C 64/124* | (2017.01) | |
| *B29C 64/255* | (2017.01) | |
| *B29C 64/40* | (2017.01) | |
| *B29K 105/00* | (2006.01) | |
| *B29K 105/08* | (2006.01) | |
| *B29C 35/08* | (2006.01) | |
| *B29C 35/02* | (2006.01) | |
| *F16L 9/128* | (2006.01) | |
| *B29C 48/15* | (2019.01) | |
| *B22F 12/00* | (2021.01) | |
| *B22F 10/10* | (2021.01) | |
| *B22F 10/00* | (2021.01) | |
| *B29C 64/245* | (2017.01) | |
| *B29C 64/112* | (2017.01) | |
| *B29K 101/10* | (2006.01) | |

(52) U.S. Cl.
CPC .............. *B33Y 50/02* (2014.12); *B33Y 70/00* (2014.12); *B22F 10/00* (2021.01); *B22F 10/10* (2021.01); *B22F 12/00* (2021.01); *B29C 35/0261* (2013.01); *B29C 35/0805* (2013.01); *B29C 48/15* (2019.02); *B29C 64/112* (2017.08); *B29C 64/245* (2017.08); *B29C 2035/0827* (2013.01); *B29C 2035/0833* (2013.01); *B29C 2035/0838* (2013.01); *B29C 2035/0855* (2013.01); *B29C 2035/0877* (2013.01); *B29K 2101/10* (2013.01); *B29K 2105/08* (2013.01); *B29K 2105/251* (2013.01); *F16L 9/128* (2013.01)

(56) References Cited

U.S. PATENT DOCUMENTS

| | | | |
|---|---|---|---|
| 3,809,514 | A | 5/1974 | Nunez |
| 3,984,271 | A | 10/1976 | Gilbu |
| 3,993,726 | A | 11/1976 | Moyer |
| 4,643,940 | A | 2/1987 | Shaw et al. |
| 4,671,761 | A | 6/1987 | Adrian et al. |
| 4,822,548 | A | 4/1989 | Hempel |
| 4,851,065 | A | 7/1989 | Curtz |
| 5,002,712 | A | 3/1991 | Goldmann et al. |
| 5,037,691 | A | 8/1991 | Medney et al. |
| 5,296,335 | A | 3/1994 | Thomas et al. |
| 5,340,433 | A | 8/1994 | Crump |
| 5,746,967 | A | 5/1998 | Hoy et al. |
| 5,866,058 | A | 2/1999 | Batchelder et al. |
| 5,916,509 | A | 6/1999 | Durhman |
| 5,936,861 | A | 8/1999 | Jang et al. |
| 6,153,034 | A | 11/2000 | Lipsker |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigali et al. |
| 6,934,600 | B2 | 8/2005 | Jang et al. |
| 7,039,485 | B2 | 5/2006 | Engelbart et al. |
| 7,555,404 | B2 | 6/2009 | Brennan et al. |
| 7,781,512 | B2 | 8/2010 | Charbonneau et al. |
| 7,795,349 | B2 | 9/2010 | Bredt et al. |
| 8,221,669 | B2 | 7/2012 | Batchelder et al. |
| 8,962,717 | B2 | 2/2015 | Roth et al. |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0006803 | A1 | 1/2005 | Owens |
| 2005/0061422 | A1 | 3/2005 | Martin |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0159785 | A1 | 6/2012 | Pyles et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0292039 | A1 | 11/2013 | Peters et al. |
| 2013/0337256 | A1 | 12/2013 | Farmer et al. |
| 2013/0337265 | A1 | 12/2013 | Farmer |
| 2014/0034214 | A1 | 2/2014 | Boyer et al. |
| 2014/0061974 | A1 | 3/2014 | Tyler |
| 2014/0159284 | A1 | 6/2014 | Leavitt |
| 2014/0232035 | A1 | 8/2014 | Bheda |
| 2014/0268604 | A1 | 9/2014 | Wicker et al. |
| 2014/0291886 | A1 | 10/2014 | Mark et al. |
| 2015/0136455 | A1 | 5/2015 | Fleming |
| 2016/0012935 | A1 | 1/2016 | Rothfuss |
| 2016/0031155 | A1 | 2/2016 | Tyler |
| 2016/0046082 | A1 | 2/2016 | Fuerstenberg |
| 2016/0052208 | A1 | 2/2016 | Debora et al. |
| 2016/0082641 | A1 | 3/2016 | Bogucki et al. |
| 2016/0082659 | A1 | 3/2016 | Hickman et al. |
| 2016/0107379 | A1 | 4/2016 | Mark et al. |
| 2016/0114532 | A1 | 4/2016 | Schirtzinger et al. |
| 2016/0136885 | A1 | 5/2016 | Nielsen-Cole et al. |
| 2016/0144565 | A1 | 5/2016 | Mark et al. |
| 2016/0144566 | A1 | 5/2016 | Mark et al. |
| 2016/0192741 | A1 | 7/2016 | Mark |
| 2016/0200047 | A1 | 7/2016 | Mark et al. |
| 2016/0243762 | A1 | 8/2016 | Fleming et al. |
| 2016/0263806 | A1 | 9/2016 | Gardiner |

(56) References Cited

U.S. PATENT DOCUMENTS

| | | |
|---|---|---|
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0015061 A1* | 1/2017 | Lewicki ............... B33Y 10/00 |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173692 A1 | 6/2017 | Myerberg et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0306171 A1* | 10/2017 | Vidavsky ............. C09D 11/101 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

(56) References Cited

OTHER PUBLICATIONS

Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

IN-SITU CURING OVEN FOR ADDITIVE MANUFACTURING SYSTEM

RELATED APPLICATIONS

This application is based on and claims the benefit of priority from U.S. Provisional Application No. 62/526,448 that was filed on Jun. 29, 2017, the contents of which are expressly incorporated herein by reference.

TECHNICAL FIELD

The present disclosure relates generally to an additive manufacturing system and, more particularly, to an additive manufacturing system having an oven for in-situ curing of a composite material.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength, compared to manufacturing processes that do not utilize continuous fiber reinforcement, some types of matrixes may require a more intense cure energy and/or a surrounding cure environment that may not be provided by the head-mounted cure enhancer alone. The disclosed additive manufacturing system is uniquely configured to provide this additional care and/or to address other issues of the prior art.

SUMMARY

In one aspect, the present disclosure is directed to a system for additively manufacturing a composite structure. The system may include a head configured to discharge a continuous reinforcement that is at least partially coated with a matrix, and a housing trailing from the head and configured to at least partially enclose the continuous reinforcement after discharge. The system may also include a heat source disposed at least partially inside the oven, and a support configured to move the head during discharging.

In another aspect, the present disclosure is directed to another system for additively manufacturing a composite structure. This system may include a head configured to discharge a continuous reinforcement that is at least partially coated with a matrix, and a housing trailing from the head and configured to at least partially enclose the continuous reinforcement after discharge. The system may also include an infrared lamp disposed at least partially inside the oven, and a UV light located between the head and the housing. The system may also include a support configured to move the head during discharging, and a controller in communication with the infrared lamp, the support, and the UV light. The controller may be configured to selectively activate the infrared lamp, the support, and the UV light based on specifications for the composite structure.

In yet another aspect, the present disclosure is directed to a method of additively manufacturing a composite structure. The method may include discharging from a head a continuous reinforcement that is at least partially coated with a matrix, and passing the matrix-coated continuous reinforcement through an oven trailing behind on the head. The method may also include exposing the matrix-coated continuous reinforcement to heat inside the oven, and moving the head during discharging to create three-dimensional trajectory in the continuous reinforcement.

DETAILED DESCRIPTION

Figure 1:
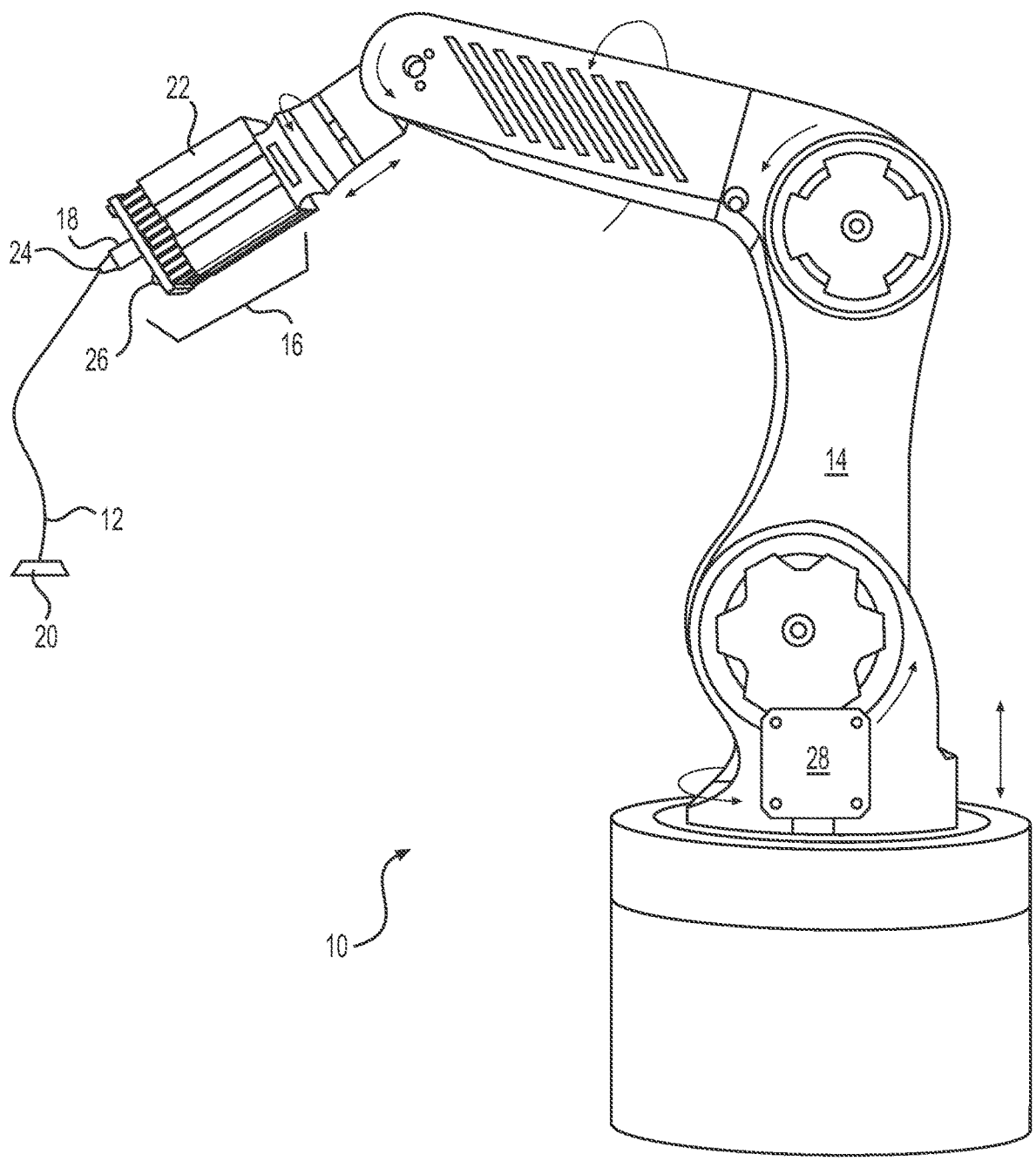
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, ellipsoidal, polygonal, etc.). System 10 may include at least a support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for similar reasons. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from a nozzle 18 of head 16 via at least two different modes of operation. In a first mode of operation, the matrix and reinforcement are extruded (e.g., pushed under pressure and/or mechanical force) from nozzle 18, as head 16 is moved by support 14 to create the 3-dimensional shape of structure 12. In a second mode of operation, at least the reinforcement is pulled from nozzle 18, such that a tensile stress is created in the reinforcement during discharge. In this mode of operation, the matrix may cling to the reinforcement and thereby also be pulled from nozzle 18 along with the reinforcement, and/or the matrix may be discharged from nozzle 18 under pressure along with the pulled reinforcement. In the second mode of operation, where the matrix is being pulled from nozzle 18, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 18 as a result of head 16 moving away from an anchor point 20. In particular, at the start of structure-formation, a length of matrix-impregnated reinforcement may be pulled and/or pushed from nozzle 18, deposited onto a stationary anchor point 20, and cured, such that the discharged material adheres to anchor point 20. Thereafter, head 16 may be moved away from anchor point 20, and the relative movement may cause additional reinforcement to be pulled from nozzle 18. It should be noted that the movement of the reinforcement through head 16 could be assisted (e.g., via internal feed mechanisms), if desired. However, the discharge rate of the reinforcement from nozzle 18 may primarily be the result of relative movement between head 16 and anchor point 20, such that tension is created within the reinforcement.

Figure 2:
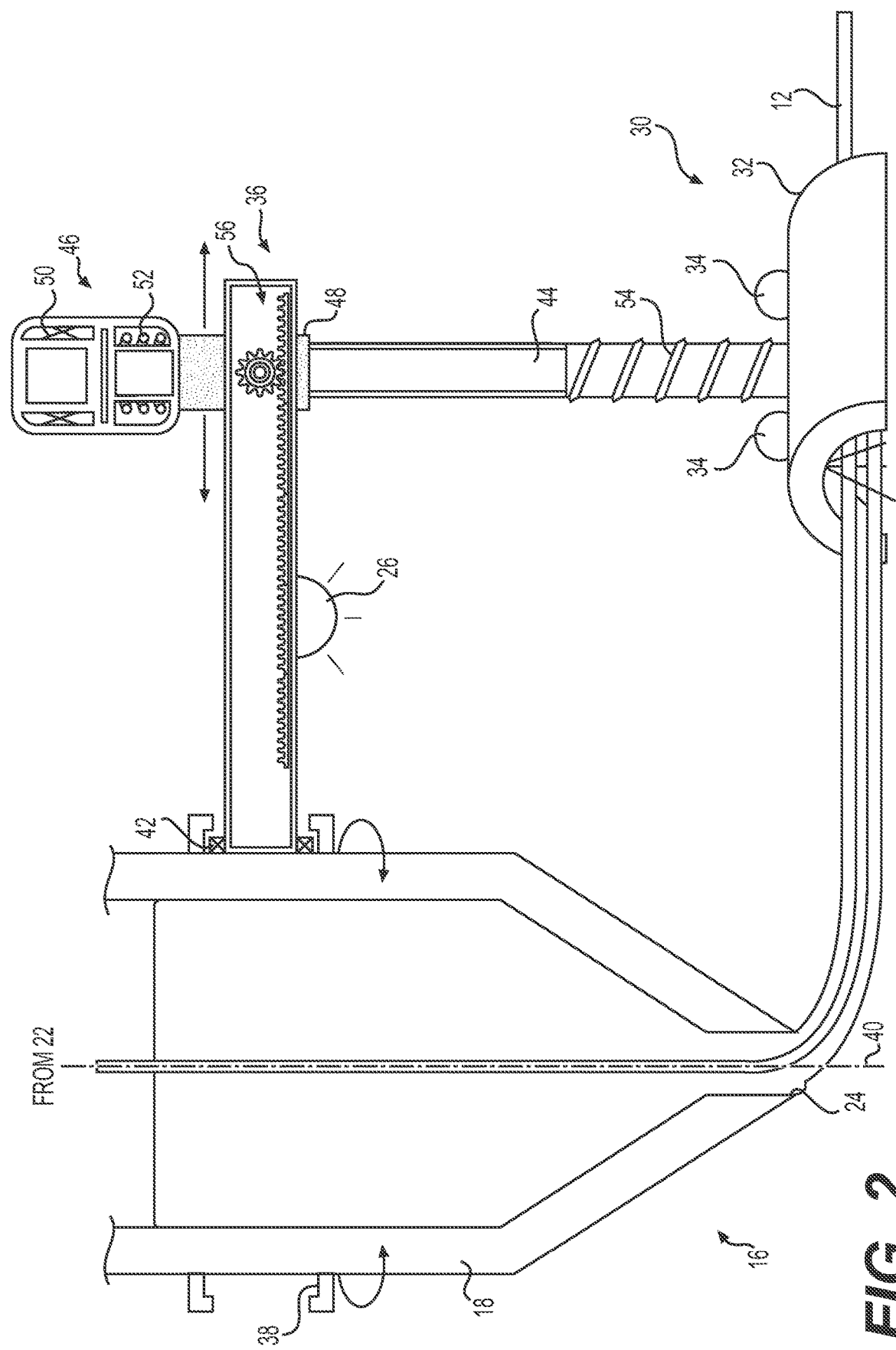
FIG. 2 is a diagrammatic illustration of an exemplary disclosed oven that may be utilized in conjunction with the manufacturing system of FIG. 1.

Nozzle 18 may be fluidly connected to a matrix reservoir 22. Although matrix reservoir 22 is shown as being at least partially inside of head 16, it should be noted that matrix reservoir 22 could alternatively be located separately upstream of head 16. As shown in FIG. 2, nozzle 18 may be a generally cylindrical component having an upstream or base end in fluid communication with matrix reservoir 22, a downstream or tip end, and one or more axially oriented passages that extend from the base end to the tip end.

Any number of reinforcements (represented as R in FIG. 2) may be passed axially through reservoir 22 where at least some matrix-wetting occurs (matrix represented as M in FIG. 2), and thereafter discharged from head 16 via nozzle 18. One or more orifices 24 may be located at the tip end of nozzle 18 to accommodate passage of the matrix-wetted reinforcements. In the disclosed embodiment, a single generally circular orifice 24 is shown. It is contemplated, however, that multiple circular orifices could be used. In addition, orifices 24 of another shape (e.g., a rectangular shape) may allow for printing of ribbons and/or sheets. In the embodiment of FIG. 2, the single orifice 24 is substantially aligned (e.g., aligned within engineering tolerances) with a central axis of nozzle 18.

Returning to FIG. 1, one or more cure enhancers (e.g., one or more light sources, electron beam generators, ultrasonic emitters, lasers, heaters, catalyst dispensers, microwave generators, etc.) 26 may be mounted on head 16 (e.g., at a trailing side of nozzle 18) and configured to enhance a cure rate and/or quality of the matrix as it is discharged from nozzle 18. Cure enhancer 26 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from nozzle 18.

A controller 28 may be provided and communicatively coupled with support 14, head 16, and any number and type of cure enhancers 26. Controller 28 may embody a single processor or multiple processors that include a means for controlling an operation of system 10. Controller 28 may include one or more general- or special-purpose processors or microprocessors. Controller 28 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 28, including power supply circuitry, signal-conditioning circuitry, solenoid/motor driver circuitry, communication circuitry, and other appropriate circuitry. Moreover, controller 28 may be capable of communicating with other components of system 10 via wired and/or wireless transmission.

One or more maps may be stored in the memory of controller 28 and used during fabrication of structure 12. Each of these maps may include a collection of data in the form of models, lookup tables, graphs, and/or equations. In the disclosed embodiment, the maps are used by controller 28 to determine desired characteristics of cure enhancers 26, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 28 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 26, such that structure 12 is produced in a desired manner In some applications, during fabrication of structure 12, it may be beneficial to provide a controlled micro-environment at or around the discharging material, in order to obtain a greater depth of curing, to facilitate a greater speed of curing, to cure with greater accuracy and control, and/or to facilitate sintering of high-temperature materials (e.g., metals). In these applications, an in-situ or traveling oven 30 (shown only in FIG. 2) may be utilized.

Oven 30 may include, among other things, a housing 32 and one or more energy (e.g., temperature, pressure, and/or humidity) sources 34 disposed at least partially inside of housing 32. Housing 32 may be configured to at least partially enclose a portion of the matrix-wetted reinforcements discharging from nozzle 18 (e.g., on at least three sides), thereby creating the micro-environment in which temperature, pressure, and/or humidity can be controlled. In addition, in some embodiments, housing 32 may function as a die to shape the matrix-wetted reinforcements prior to complete curing. In the disclosed embodiment, housing 32 has a U-shaped cross-section, although other shapes are also contemplated. For example, housing 32 could be ring-like and completely surround the matrix-wetted reinforcement (e.g., when the matrix-wetted reinforcement is to be formed into a rod or a tube).

In one exemplary embodiment, source 34 is an infrared lamp, a laser, and/or another heat source used to warm and/or melt particles (e.g., metallic particles) embedded with the matrix or otherwise stuck to the reinforcements. In this embodiment, energy source 34 may be selectively activated by controller 28 (referring to FIG. 1) to cause the particles to coalesce and thereby form a foam layer or shell around the reinforcements. It is contemplated that, in some instances, after formation of the foam layer or solid shell, the reinforcements may be removed (e.g., via the sintering process, via a rinsing process, or via another post-process), thereby leaving a hollow metallic tube having a three-dimensional trajectory.

Oven 30 may be operatively mounted to head 16 (e.g., at a trailing side of nozzle 18) by way of an arm 36. In a first embodiment, arm 36 is rigidly connected to head 16, such that an angular orientation of oven 30 is fixed. In this embodiment, care should be taken to ensure that head 16 is properly oriented relative to a travel and/or material discharge direction during activation of oven 30, such that oven 30 is located at the trailing side of nozzle 18. In a second embodiment, the angular orientation of oven 30 is adjustable. For example, a base end of arm 36 may be moveable within an annular channel 38 of head 16 (e.g., a channel that surrounds nozzle 18). With this configuration, oven 30 may be pivoted about an axis 40 of nozzle 18 (e.g., via energizing of a rotary actuator 42) to any desired angle.

In some embodiments, oven 30 may be moveable with respect to arm 36. For example, a plunger 44 may extend in the axial direction between oven 30 (e.g., between housing 32) and arm 36. Plunger 44 may be moveable (e.g., via energizing of an actuator 46) between a normal or stowed position (not shown) and any number of extended or engaged positions (shown in FIG. 2). When plunger 44 is in the stowed position, oven 30 may be deactivated and structure 12 discharging from head 16 may receive little if any energy from oven 30. In contrast, when plunger 44 is one of the engaged positions, energy from oven 30 may be directed toward and/or at least partially around structure 12. Multiple positions may be available, in some applications, such that a variable level of heat and/or other surrounding oven conditions (e.g., humidity and/or pressure) may be exerted on the discharging material.

Actuator 46 may be selectively operable to move plunger 44 between the stowed and engaged positions. In the disclosed example, actuator 46 is an electric solenoid mounted to arm 36 (e.g., via bushing a 48 mounted to or within arm 36) and configured to internally receive or otherwise engage a base end of plunger 44. Windings 50 of actuator 46 may be selectively energized to generate a magnetic field that urges plunger 44 toward the engaged position. A return spring 52 may return plunger 44 to the stowed position upon de-energizing of windings 50. It should be noted that, although an electric solenoid has been shown and discussed as an example of actuator 46, other types of actuators (e.g., pneumatic cylinders, hydraulic lead screws, etc.) could be utilized, if desired.

In the disclosed embodiment, the movement between the stowed and engaged position(s) is linear and oriented generally parallel with axis 40 of head 16. It is contemplated, however, that other movements (e.g., rotary movements, pivoting movements, etc.) may be possible. The linear movement may be facilitated via axial sliding of plunger 44 through bushing 48. A resilient member (e.g., a spring) 54 may be connected between arm 36 and housing 32 (e.g., around plunger 44) to bias housing 32 away from arm 36 and toward the path of (e.g., into engagement with the) discharging material.

In one embodiment, a radial distance between oven 30 and nozzle 18 may also be adjustable. This adjustability may be provided in any number of ways. For example, bushing 48 may be operatively disposed within a slot or track 56 of arm 36, and one or more mechanized devices (e.g., a motor-driven rack-and-pinion, a motor-driven lead screw, etc.) may be used to shift bushing 48 laterally within track 56.

In one example, cure enhancer 26 is connected to a lower surface (i.e., a surface oriented toward structure 12) of arm 36 (e.g., between nozzle 18 and oven 30). As will be described in more detail below, cure enhancer 26, actuator 46, and oven 30 may be cooperatively regulated by controller 28 during a manufacturing event.

INDUSTRIAL APPLICABILITY

The disclosed system and oven may be used to continuously manufacture composite structures having any desired cross-sectional size, shape, length, density, and/or strength. The composite structures may include any number of different reinforcements of the same or different types, diameters, shapes, configurations, and consists, each coated with a common matrix. In addition, the disclosed system and oven may allow for better curing and/or sintering of a greater range of materials (e.g., of high-temperature materials). Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, cure/sinter specifications, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing the reinforcements down through matrix reservoir 22, and then threading the reinforcements through nozzle 18. Installation of the matrix may include filling reservoir 22 within head 16 and/or coupling of an extruder or external bath (not shown) to head 16. Head 16 may then be moved by support 14 under the regulation of controller 28 to cause matrix-coated reinforcements to be placed against or on a corresponding stationary anchor point 20. Cure enhancers 26 within head 16 may then be selectively activated to cause hardening of the matrix surrounding the reinforcements (e.g., of at least an outer surface of the matrix), thereby bonding the reinforcements to anchor point 20.

The component information may then be used to control operation of system 10. For example, the reinforcements may be pulled and/or pushed from nozzle 18 (along with the matrix), while support 14 selectively moves head 16 in a desired manner during exposure of the matrix-coated reinforcements to cure energy from enhancers 26, such that an axis of the resulting structure 12 follows a desired trajectory (e.g., a free-space, unsupported, 3-D trajectory).

In addition, oven 30 may be selectively activated to produce a desired micro-environment that facilitates a greater depth of curing (e.g., curing of internal portions of the matrix), to facilitate a greater speed of curing, to cure with greater accuracy and control, and/or to facilitate sintering of high-temperature materials (e.g., metals). This activation may include, among other things, selectively energizing of energy source(s) 34 and/or the axial or radial positioning of housing 32 relative to the discharging material.

In one example, the amount of curing produced by cure enhancers 26 is only surface deep or otherwise sufficient to only harden an outer shell of structure 12 (e.g., to thereby retain a desired shape), while leaving internal portions of structure 12 under-cured. In this example, as oven 30 thereafter passes over structure 12, the internal portions of structure 12 may be more fully cured when exposed to the micro-environment (e.g., the elevated temperature, pressure, and/or humidity) inside of housing 32.

In another example, cure enhancers 26 may produce enough energy to cure only the matrix material binding other particles (e.g., metallic particles) to the reinforcement, but not necessarily enough to cause a desired state change of the associated particles. In this example, as oven 30 thereafter passes over structure 12, the energy from oven 30 may cause the particles to melt, coalesce, and/or sinter.

In yet another example, while the cure energy of cure enhancers 26 may be sufficiently high to cure and/or sinter the materials of structure 12, a dwell time of cure enhancers 26 may be too low. In this situation, oven 30, while not necessarily exposing structure 12 to a higher level of energy, may extend a time during which the structure is exposed to cure energy. This time may be at least partially dependent on a length of housing 32 and/or a number of energy sources 34 disposed inside of housing 32.

In a final example, the cure energy of cure enhancers 26 may be sufficiently high for a sufficient duration to cure the outer shell of structure 12, but a specific cure recipe may be required to provide a desired hardness, desired shape, desired expansion rate, or other desired property within structure 12. In this situation, oven 30 may be selectively activated at varying levels (e.g., increasing levels) and for varying durations in specific sequences to provide the desired properties within structure 12.

It will be apparent to those skilled in the art that various modifications and variations can be made to the disclosed systems and oven. Other embodiments will be apparent to those skilled in the art from consideration of the specification and practice of the disclosed system and oven. For example, it is contemplated that a sensor could be integrated into oven 30 (e.g., mounted within housing 32), such that controller 28 may regulate operation of energy source(s) 34 based on feedback from the sensor. It is intended that the specification and examples be considered as exemplary only, with a true scope being indicated by the following claims and their equivalents.

What is claimed is:

1. A system for additively manufacturing a composite structure, the system comprising:
   a head configured to discharge a continuous reinforcement that is at least partially coated with a matrix;
   a housing trailing from the head and configured to at least partially enclose the continuous reinforcement after discharge;
   a heat source disposed at least partially inside the housing;
   a support configured to move the head during discharging; and
   a cure enhancer located between the head and the housing.

2. The system of claim 1, wherein:
   the cure enhancer is a UV light; and
   the heat source is an infrared lamp.

3. The system of claim 1, wherein:
   the cure enhancer is configured to produce at least one of a first type and a first amount of cure energy that cures only an outer shell of the matrix; and
   the heat source is configured to produce at least one of a second type and a second amount of cure energy different from the at least one of the first type of the first amount and that cures an inner portion of the matrix.

4. The system of claim 1, wherein:
   the cure enhancer is configured to produce at least one of a first type and a first amount of cure energy that cures only the matrix; and
   the heat source is configured to produce at least one of a second type and a second amount of cure energy different from the at least one of the first type of the first amount and that cures particles suspended in the matrix.

5. The system of claim 4, wherein the particles are metallic.

6. The system of claim 1, further including a controller in communication with the heat source and the support, the controller being configured to selectively activate the heat source and the support based on specifications for the composite structure.

7. The system of claim 1, further including an arm extending radially from the head to the housing.

8. The system of claim 7, further including a plunger slidingly connecting the housing to the arm.

9. The system of claim 8, wherein the housing is at least one of:
axially adjustable relative to the arm; and
radially adjustable relative to the head.

10. The system of claim 1, wherein the housing is configured to enclose the continuous reinforcement on at least three sides.

11. A system for additively manufacturing a composite structure, the system comprising:
a head configured to discharge a continuous reinforcement that is at least partially coated with a matrix;
a housing trailing from the head and configured to at least partially enclose the continuous reinforcement after discharge;
an infrared lamp disposed at least partially inside the housing;
a UV light located between the head and the housing; and
a support configured to move the head during discharging;
a controller in communication with the infrared lamp, the support, and the UV light, the controller being configured to selectively activate the infrared lamp, the support, and the UV light based on specifications for the composite structure.

12. The system of claim 11, wherein:
the UV light is configured to produce an amount of light that cures only an outer shell of the matrix; and
the infrared lamp is configured to cure produce an amount of heat that cures an inner portion of the matrix.

13. The system of claim 11, wherein:
the UV light is configured to produce an amount of light that cures only the matrix; and
the infrared lamp is configured to produce an amount of heat that cures particles suspended in the matrix.

14. The system of claim 13, wherein the particles are metallic.

15. A system for additively manufacturing a composite structure, the system comprising:
a head configured to discharge a composite material;
a housing connected to a trailing side of the head and configured to at pass over the composite material discharged from the head;
a source disposed at least partially inside the housing and configured to direct cure energy toward the composite material; and
a support configured to move the head during discharging; and
a cure enhancer configured to direct cure energy to the composite material.

16. The system of claim 15, wherein the cure enhancer is configured to direct cure energy to the composite material at a location between the head and the housing.

17. The system of claim 16, wherein:
the cure energy from the cure enhancer is of a first amount sufficient to cure the composite material only enough for the composite material to retain a discharged shape; and
the cure energy from the source is of a second amount different from the first amount and sufficient to through-cure the composite material.

18. The system of claim 16, wherein the cure energy from the cure enhancer is a different form of energy than the cure energy from the source.

19. The system of claim 16, wherein:
the cure enhancer is a light source; and
the source is a heat source.

* * * * *